United States Patent Office 3,835,048
Patented Sept. 10, 1974

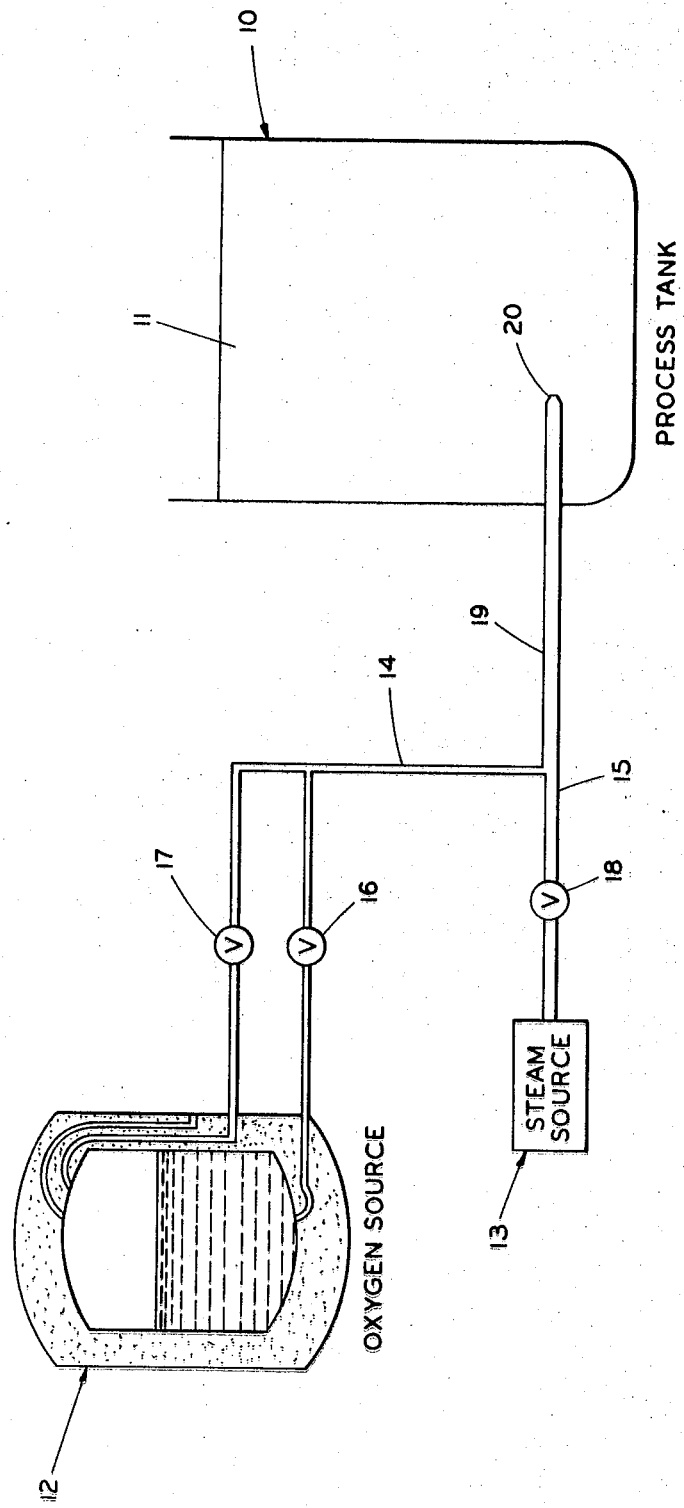

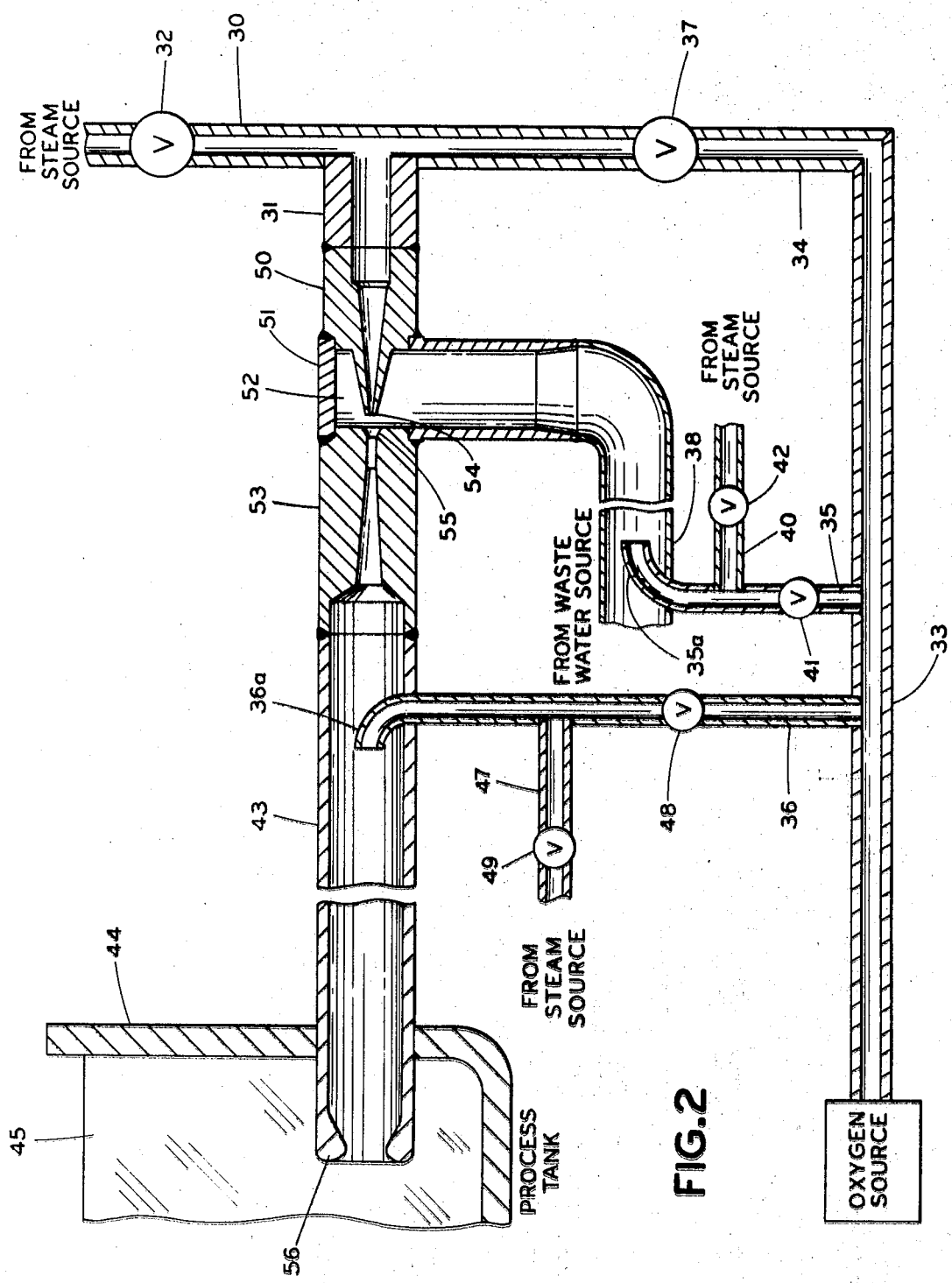

3,835,048
METHOD OF DISSOLVING GASES IN LIQUIDS
Fredrick L. Walter, 2304 Oak Lane,
Rolling Meadows, Ill. 60008
Filed Aug. 2, 1972, Ser. No. 277,352
Int. Cl. B01f 3/04
U.S. Cl. 210—63          13 Claims

ABSTRACT OF THE DISCLOSURE

A gas is dissolved in a liquid by mixing the gas with condensable vapor such as steam and introducing the vapor and gas to the liquid where the vapor condenses to permit dispersed bubbles of the gas to dissolve in the liquid. In another embodiment gas, condensable vapor, and some liquid are mixed, the pressure of the mixture is increased to facilitate dissolution of the gas in the liquid, and the mixture is introduced into more liquid.

BACKGROUND

This invention relates to a method of dissolving gases in liquids and finds particular utility in treating sewage by dissolving oxygen in the sewage.

BOD containing waste water has been treated with air and oxygen, but certain problems have been encountered with prior art methods. The difficulty with using air is that only a minor percentage of the air is oxygen, and a relatively large volume of air must be used in order to provide the desired quantity of oxygen.

Oxygen is comparatively expensive, and if this gas is used to treat sewage, the oxygen must be used relatively sparingly and efficiently. Oxygen is not readily soluble in BOD containing water, and it is believed that no satisfactory means or method for efficiently treating BOD containing water with pure oxygen has heretofore been devised.

Typical of certain prior art approaches to the oxygen in treating BOD containing water are five patents, Nos. 3,547,811 through 3,547,815. These patents teach oxidation merely by allowing the liquid to contact the oxygen in aeration zones which may be staggered, and use of a sparger is suggested for merely introducing the oxygen to the liquid. I have found that simple nozzles generally do not provide sufficient dissolution of oxygen to be economically feasible.

Other means for introducing oxygen into waste water include roofs, baffled areas, pumps and other relatively expensive equipment which generally make the system impractical for small plants.

Other problems in the use of oxygen for treating waste water involve the safety problems associated with pure oxygen and the often complex nature of the equipment which requires experienced operators to provide efficient and satisfactory operation.

SUMMARY

I have developed a method for dissolving gases in liquids which is particularly suitable for dissolving oxygen in sewage material and which provides for good dissolution of the gas, minimizes safety problems relating to the gas, requires relatively low maintenance, and can be operated by relatively inexperienced operators. The method as it relates to sewage treatment utilizes steam or other condensable vapor to provide the energy for mixing oxygen with BOD containing waste water and for pumping the mixture of oxygen and waste water. In one embodiment of the invention steam and oxygen are continuously conducted from their sources to a mixing chamber and then discharged through a nozzle into a process tank filled with BOD containing waste water. The steam condenses in the waste water leaving small bubbles of oxygen which are easily dissolved in the waste water. The jets of steam and oxygen discharging into the process tank continuously pump waste water away from the nozzles and bring waste water low in oxygen content with the jets. In another embodiment of the invention waste water is aspirated and pumped to high pressure with condensing steam, and the oxygen, which may be mixed with the steam, and/or aspirated with the waste water, and/or injected at high pressure, dissolves in the high pressure waste water. The condensed steam, waste water and oxygen are then discharged through a nozzle into the process tank.

DESCRIPTION OF THE DRAWING

The invention will be explained in conjunction with illustrative embodiments shown in the accompanying drawing, in which—

FIG. 1 is a schematic illustration of one embodiment of the invention; and

FIG. 2 is a schematic illustration of another embodiment of the invention.

DESCRIPTION OF SPECIFIC EMBODIMENT

The invention will be explained in conjunction with the method of dissolving oxygen in BOD containing waste water. It will be understood, however, that the invention may also be used for dissolving oxygen as well as other gases in other liquids.

Referring now to FIG. 1, the numeral 10 designates generally a process tank or holding chamber filled with BOD containing water 11, the numeral 12 a suitable source of oxygen, such as a tank filled with liquid and gaseous oxygen, and the numeral 13 a suitable steam source. If desired, anaerobic digestion may be used to produce combustible methane for heating water to produce the steam.

A pipe or conduit 14 communicates with the oxygen source, and a pipe or conduit 15 communicates with the steam source. Suitable valves 16, 17 and 18 may be interposed in the conduits for regulating the flow of fluid therethrough. The conduits 14 and 15 convey the oxygen and steam to a conduit 19 which provides a mixing chamber or mixing zone for mixing the oxygen and steam, and the conduit 19 extends into the process tank adjacent the bottom thereof, terminating in a nozzle 20.

When the mixture is discharged into the process tank, the steam will condense to water, leaving the oxygen highly dispersed in the waste water. Because of the high dispersal, relatively small bubbles of oxygen will be formed, which, because of the large surface area compared to the size and mass of the bubbles, will rise slowly in the waste water and provide a long contact time. The long contact time, combined with the high surface area to mass ratio of the bubbles insures substantially complete or relatively high dissolution of the oxygen in the waste water.

Dissolution of the oxygen is also facilitated by the velocity of the steam as it is injected into the waste water through the nozzle 20. The velocity of the steam jets agitates the waste water and continuously pumps waste water away from the nozzle and brings waste water relatively low in oxygen into contact with the jet.

Although I have described the use of a single nozzle 20, the conduit 19 can be connected to a header or manifold provided with a number of nozzles for simultaneously injecting steam and oxygen into the waste water at a plurality of discrete locations within the tank.

It is believed that adjusting the valves to provide a mixture of approximately 90% steam and 10% oxygen in the conduit 19 is particularly advantageous.

A modified embodiment of the invention is illustrated in FIG. 2. A steam conduit 30 conducts steam from a suitable source of steam (not shown) to an inlet conduit 31, which is provided with a valve 32. Oxygen manifold or conduit 33 supplies oxygen from an oxygen source to oxygen conduits 34, 35, and 36. The conduit 34 is connected to the inlet conduit 31, and a valve 37 is interposed therein. The conduit 35 extends into conduit 38 which is connected to a suitable supply of waste water (not shown). A steam supply conduit 40 is connected to the oxygen conduit 35, and valves 41 and 42 are provided for the conduits 35 and 40. Oxygen conduit 36 extends into conduit 43 which extends into a process tank or holding chamber 44 filled with BOD containing water 45. In the illustration given the oxygen conduits 35 and 36 terminate in elbows 35a and 36a, respectively, for introducing the oxygen generally coaxially within the conduits 38 and 43. This method of introducing the oxygen is advantageous but not necessary. A steam supply conduit 47 is connected to the oxygen conduit 36, and valves 48 and 49 are provided in the conduits 36 and 47.

The inlet conduit 31 is connected to a converging nozzle 50 which discharges into a pipe or conduit 51 which provides a low pressure chamber 52. The conduit 38 which communicates with the waste water supply is also connected to the conduit 51. A diverging nozzle 53 connects the low pressure chamber to the conduit 43, and the outlet 54 of the converging nozzle and the inlet 55 of the diverging nozzle are axially aligned. The conduit 43 extends from the diverging nozzle and provides a high pressure and mixing chamber. The end of the conduit 43 terminates in a converging nozzle 56 within the process tank, the nozzle serving as back pressure means for maintaining the pressure within the conduit 43.

The embodiment of the invention illustrated in FIG. 2 also utilizes steam to provide the energy for mixing oxygen with the BOD containing waste water and for pumping the mixture. Further, this embodiment incorporates the pumping capability of the steam and oxygen mixture to pump waste water to a high pressure in a side stream process. The high pressure achieved increases the speed and extent of oxygen dissolution in the waste water.

Steam is conducted through the conduits 30 and 31 to the converging nozzle 50. As the steam flows through the nozzle 50 its velocity is increased. The waste water in the conduit 38 is aspirated by the steam in the low pressure chamber and the waste water is mixed with the steam which is condensed passing through the converging nozzle. The condensed steam and waste water then pass from the low pressure chamber 52 into the diverging nozzle which increases the pressure of the condensed steam and waste water. The waste water in the conduit 38 may be raw sewerage or may be waste water supplied from the process tank.

Oxygen can be introduced at one or more points in the system. By opening valve 37, oxygen can be mixed with the steam within the conduit 31, which would then provide a mixing zone for the steam and oxygen. The steam and oxygen mixture will then pass through the nozzle 50 into the low pressure chamber and then through the nozzle 53.

Alternatively, or additionally, oxygen can be introduced through the conduit 35 and mixed with the waste water in the conduit 38. If desired, this oxygen can be mixed with steam before contacting the waste water by opening the valve 42 in the conduit 40. The conduit 38 is shown broken in FIG. 2 and can be relatively long to provide a substantial contact time for the oxygen and waste water during which much of the oxygen may dissolve.

Oxygen can also be introduced through the conduit 36 into the high pressure chamber provided by the conduit 43. If desired, the oxygen introduced through the conduit 36 can be mixed with steam before reaching the high pressure chamber by opening the valve 49.

The oxygen can be introduced through one or more of the conduits 34–36 by opening the valves 37, 41 and 48 as desired, and the rate of flow of the oxygen through each conduit can be varied as desired by the valves. Whether the oxygen is mixed with the steam in the mixing zone provided by the conduit 31, the mixing zone provided by the conduit 51, or the mixing zone provided by the conduit 43, or in a combination of these zones, dissolution of oxygen in the waste water is increased in the high pressure chamber provided by the conduit 43. As the pressure of the waste water is increased, the solubility of the oxygen therein increases.

The steam, waste water, and oxygen is conducted into the process tank by the conduit 43, which terminates in the nozzle 56, and the mixture is thereby ejected into the BOD containing waste water at a substantial velocity. Dissolution of the oxygen in the waste water within the conduit 43 is increased by the high pressure, and oxygen which is not dissolved is dispersed in the process tank as discussed hereinbefore with respect to FIG. 1 so that further dissolution can be accomplished with a resulting high utilization of the oxygen supplied. If desired, the conduit 43 can be connected to a header or manifold which is provided with a plurality of nozzles for injecting the mixture into the process tank at a number of locations.

The amounts of oxygen and steam permitted to flow past the various valves depends upon the individual design of the injector system and the supply, temperature, and pressures of both the steam and oxygen. However, optimum flow rates past the various valves for a particular system can readily be achieved by those skilled in the art.

I have described the invention in conjunction with steam, but other condensable vapors such as vaporized freon and the like can also be used. In general a high energy vapor is desirable, i.e., a vapor with a high enthalpy compared with the enthalpy it will have after passing through the nozzle might be of the order of six times greater than the enthalpy after passing the nozzle.

While in the foregoing specification, detailed descriptions of specific embodiments of the invention were set forth for the purpose of illustration, it is to be understood that many of the details herein given may be varied considerably by those skilled in the art without departing from the spirit and scope of the invention.

I claim:

1. A method of treating BOD containing water comprising the steps of providing a source of steam and a source of oxygen, conducting the steam away from the steam source at high velocity into a low pressure chamber, introducing waste water to the low pressure chamber, condensing the steam, conducting the condensed steam and the waste water from the low pressure chamber through pressure-increasing nozzle means into a high pressure chamber to increase the pressure of the condensed steam and the waste water, conducting oxygen away from the oxygen source and mixing the oxygen with the condensed steam and waste water whereby oxygen is dissolved in the waste water in the high pressure chamber, and conducting the condensed steam and waste water and oxygen to a BOD containing waste water process tank.

2. The method of claim 1 including the step of mixing steam with oxygen before the oxygen is conducted into the high pressure chamber.

3. The method of claim 1 in which oxygen is mixed with and partially dissolved in the waste water prior to being conducted into the low pressure chamber.

4. The method of claim 3 including the step of mixing steam with oxygen before oxygen is conducted into the high pressure chamber.

5. The method of claim 3 including the step of mixing steam with oxygen before the oxygen is mixed with waste water.

6. The method of claim 1 including the step of mixing steam with oxygen before the oxygen is mixed with waste water.

7. The method of claim 1 in which the condensed steam and waste water and oxygen is conducted into the process tank through a nozzle.

8. A method of treating BOD containing water comprising the steps of providing a source of steam and a source of oxygen, conducting oxygen from the oxygen source to a waste water supply conduit, mixing and partially dissolving the oxygen with the waste water and conducting the oxygen and the waste water to a low pressure chamber, conducting the steam away from the steam source at high velocity into a low pressure chamber to condense the steam, conducting the condensed steam and the waste water and the oxygen from the low pressure chamber through a pressure increasing nozzle into a high pressure chamber to increase the pressure of the condensed steam and the waste water and the oxygen whereby oxygen is further dissolved in the waste water in the high pressure chamber, and conducting the condensed steam and waste water and oxygen to a BOD containing waste water holding chamber.

9. The method of claim 8 including the step of mixing steam with oxygen before the oxygen is conducted into the waste water supply conduit.

10. The method of claim 8 including the step of mixing oxygen with the steam before the steam is conducted to the low pressure chamber.

11. The method of claim 8 in which the condensed steam and waste water and oxygen is conducted into the holding chamber through a nozzle.

12. A method of treating BOD containing water comprising the steps of providing a source of steam and a source of oxygen, conducting the steam away from the steam source, conducting the oxygen away from the oxygen source, mixing the steam and the oxygen and conducting the steam and the oxygen at high velocity into a low pressure chamber, introducing waste water to the low pressure chamber, condensing the steam, conducting the condensed steam and oxygen and waste water from the low pressure chamber through pressure increasing nozzle means into a high pressure chamber to increase the pressure of the condensed steam and oxygen and the waste water whereby oxygen is rapidly dissolved in the waste water in the high pressure chamber, and conducting the condensed steam and oxygen and waste water to a BOD containing waste water holding chamber.

13. The method of claim 12 in which the condensed steam and waste water and oxygen is conducted into the holding chamber through a nozzle.

References Cited

UNITED STATES PATENTS

| | | | |
|---|---|---|---|
| 1,483,256 | 2/1924 | Van Meter | 210—62 X |
| 3,505,213 | 4/1970 | Anthony et al. | 210—63 X |
| 3,549,528 | 12/1970 | Armstrong | 210—63 X |

CHARLES N. HART, Primary Examiner

P. A. HRUSKOCI, Assistant Examiner

U.S. Cl. X.R.

261—76